United States Patent
Manning et al.

(10) Patent No.: US 8,964,503 B2
(45) Date of Patent: Feb. 24, 2015

(54) PETROPHYSICS-GUIDED PROCESSING OF LWD ACOUSTIC DATA

(75) Inventors: Michael J. Manning, Tulsa, OK (US); Luis Jordan Andonof, Billere (FR); Terrence H. Quinn, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 617 days.

(21) Appl. No.: 12/767,260

(22) Filed: Apr. 26, 2010

(65) Prior Publication Data
US 2010/0284247 A1 Nov. 11, 2010

Related U.S. Application Data

(60) Provisional application No. 61/173,476, filed on Apr. 28, 2009.

(51) Int. Cl.
*G01V 1/00* (2006.01)
*G01V 1/48* (2006.01)
*G01V 1/30* (2006.01)
*G01V 1/28* (2006.01)

(52) U.S. Cl.
CPC ...... *G01V 1/48* (2013.01); *G01V 1/306* (2013.01); *G01V 1/28* (2013.01); *G01V 1/288* (2013.01)
USPC .................................................. 367/35; 702/6

(58) Field of Classification Search
CPC ............. G01V 1/28; G01V 1/48; G01V 1/50; G01V 1/288; G01V 1/306
USPC ................. 367/25, 31, 35, 73; 702/6–9, 11
See application file for complete search history.

(56) References Cited

U.S. PATENT DOCUMENTS

| | | | |
|---|---|---|---|
| 4,198,702 A | 4/1980 | Clifford | |
| 4,594,691 A | 6/1986 | Kimball et al. | |
| 4,658,383 A | 4/1987 | Zimmer | |
| 4,700,803 A | 10/1987 | Mallett et al. | |
| 5,001,675 A | 3/1991 | Woodward | |
| 5,263,067 A | 11/1993 | Ekeroth et al. | |
| 5,265,067 A * | 11/1993 | Chang | 367/31 |
| 5,644,550 A | 7/1997 | Priest | |
| 6,088,294 A | 7/2000 | Leggett, III et al. | |
| 6,581,010 B2 | 6/2003 | Dubinsky et al. | |
| 6,718,265 B2 | 4/2004 | Herron et al. | |
| 6,850,168 B2 | 2/2005 | Tang et al. | |
| 7,587,936 B2 | 9/2009 | Han | |
| 7,668,043 B2 * | 2/2010 | Wu | 367/31 |
| 7,830,744 B2 * | 11/2010 | Wu et al. | 367/31 |
| 7,869,955 B2 * | 1/2011 | Zhang et al. | 702/14 |
| 2005/0263691 A1 * | 12/2005 | Guo | 250/266 |
| 2007/0097787 A1 | 5/2007 | Moos | |
| 2008/0165619 A1 * | 7/2008 | Bachrach et al. | 367/38 |
| 2009/0005995 A1 | 1/2009 | Tang et al. | |

OTHER PUBLICATIONS

Manning, M., et al., "Petrophysics-Guided Processing of LWD Acoustic Logs," SPWLA Symposium, The Woodlands, TX (2009).

* cited by examiner

*Primary Examiner* — Krystine Breier
(74) *Attorney, Agent, or Firm* — Mossman Kumar & Tyler PC

(57) ABSTRACT

Formation evaluation measurements are used to estimate formation lithology. The estimated lithology is used to provide an estimate of acoustic wave slowness. The estimated acoustic wave slowness is used to provide processing parameters for acoustic data that are less sensitive to noise.

20 Claims, 15 Drawing Sheets
(2 of 15 Drawing Sheet(s) Filed in Color)

US 8,964,503 B2

PETROPHYSICS-GUIDED PROCESSING OF LWD ACOUSTIC DATA

CROSS-REFERENCES TO RELATED APPLICATIONS

This application claims priority from U.S. Provisional Patent Application Ser. No. 61/173,476 filed on 28 Apr., 2009

FIELD OF THE DISCLOSURE

The present disclosure is a method of processing of array acoustic data.

BACKGROUND OF THE ART

This disclosure relates generally to systems for drilling boreholes for the production of hydrocarbons and more particularly to a drilling system having an acoustic measurement-while-drilling ("MWD") system as part of a bottomhole assembly for measuring acoustic velocities of subsurface formations during drilling of the wellbores. Specifically, this disclosure relates to a method of processing the acoustic measurements using other formation evaluation measurements to guide the processing. An important aspect of this is the use of semblance processing in which the semblance of array seismic data is determined and peak values of the semblance are used to estimate the slowness (inverse of velocity) of acoustic waves.

Drilling processes generate very complex noise environments that affect LWD (Logging While Drilling) borehole acoustic measurements. Noise and uneven BHA (bottom hole assembly) motion occur when drilling and logging through beds of mixed lithology and variable rock mechanical properties, or when penetrating beds at high borehole inclination. Acoustic log semblance processing then becomes difficult and several possible solutions may present themselves to the processing analyst. When using prior art methods, the processing analyst was challenged to discover satisfactory parameter settings for producing high quality semblance results in some difficult while-drilling environments and complicated formations. Because of environmental conditions and drilling dynamics experienced through these formations, the signal-to-noise ratio of the acquired acoustic signal is only moderate, and it is challenging for an acoustic processor not well aware of local geology to set the proper processing parameters required to obtain good results.

The approach of the present disclosure is to build a petrophysical model from other log data, and then compute from this model theoretical values of acoustic compressional and shear slowness. With a petrophysically-derived slowness as a guide, the acoustic wave analyst can now interactively adjust the processing window in frequency space so as to obtain a clearly defined semblance correlogram resulting in the production of a high confidence acoustic slowness. The end result of this technique provides a much improved acoustic slowness to convolve into a complete geophysical interpretation.

For the purposes of the present disclosure, the following definition of "petrophysical properties" is adopted. A petrophysical property includes "lithology" (the type of rock, commonly determined using log measurements such as natural gamma ray, neutron, density, photoelectric, resistivity and NMR), the porosity, water saturation and permeability. The list is not intended to be all-inclusive.

SUMMARY OF THE DISCLOSURE

One embodiment of the disclosure is a method of evaluating an earth formation. The method includes conveying a carrier into a borehole; acquiring acoustic data indicative of a property of the earth formation using an acoustic device on the carrier; and using a processor for processing the acquired acoustic data using processing parameters derived from a petrophysical analysis of lithologic data including the acquired acoustic data.

Another embodiment of the disclosure is an apparatus configured to evaluate an earth formation. The apparatus includes a carrier configured to be conveyed into a borehole; an acoustic device on the carrier configured to acquire acoustic data indicative of a property of the earth formation; and a processor configured to process the acquired acoustic data using processing parameters derived from petrophysical analysis of lithologic data including the acquired acoustic data.

Another embodiment of the disclosure is computer-readable medium product having stored thereon instructions that when read by a processor cause the processor to execute a method. The method includes: processing acoustic data acquired by an acoustic device on a carrier in a borehole using processing parameters derived from petrophysical analysis of lithologic data including the acquired acoustic data.

BRIEF DESCRIPTION OF THE DRAWINGS

The file of this patent contains at least one drawing executed in color: Copies of this patent with color drawing(s) will be provided by the Patent and Trademark Office upon request and payment of the necessary fee.

For detailed understanding of the present disclosure, reference should be made to the following detailed description of a specific embodiment, taken in conjunction with the accompanying drawing and in which:

FIG. 5 shows correlograms of the data of FIG. 4a;

DETAILED DESCRIPTION OF THE DISCLOSURE

In general, the present disclosure provides a drilling system for drilling of boreholes. The drilling system contains a drill string having a downhole subassembly that includes a drill bit at its bottom end and a plurality of sensors and MWD devices, including an acoustic MWD system having a first set of acoustic sensors for determining the formation acoustic velocity while drilling the borehole and a second set of acoustic sensors for determining the bed boundaries by utilizing the acoustic velocity measurements made by the first set of acoustic sensors. A downhole computer and associated memory are provided for computing various downhole operating parameters, to map the formation around the downhole subassembly, to update stored models and data as a result of the computed parameters and to aid the driller in navigating the drill string along a desired wellbore profile.

The system of the disclosure may also include devices for determining the formation resistivity, gamma ray intensity of the formation, the drill string inclination and the drill string azimuth, neutron porosity of the formation and the formation bulk density. The drill string may contain other MWD devices known in the art for providing information about the subsurface geology, borehole conditions and mud motor operating parameters, such as the differential pressure across the mud motor, torque and the condition of the bearing assembly. Selected data is transmitted between the downhole subassembly and surface computing apparatus via a two-way telemetry system. The surface computing apparatus transmits signals to the downhole subassembly for controlling certain desired operations and also for processing the received data according to programmed instruction to improve the drilling operations.

Figure 1:
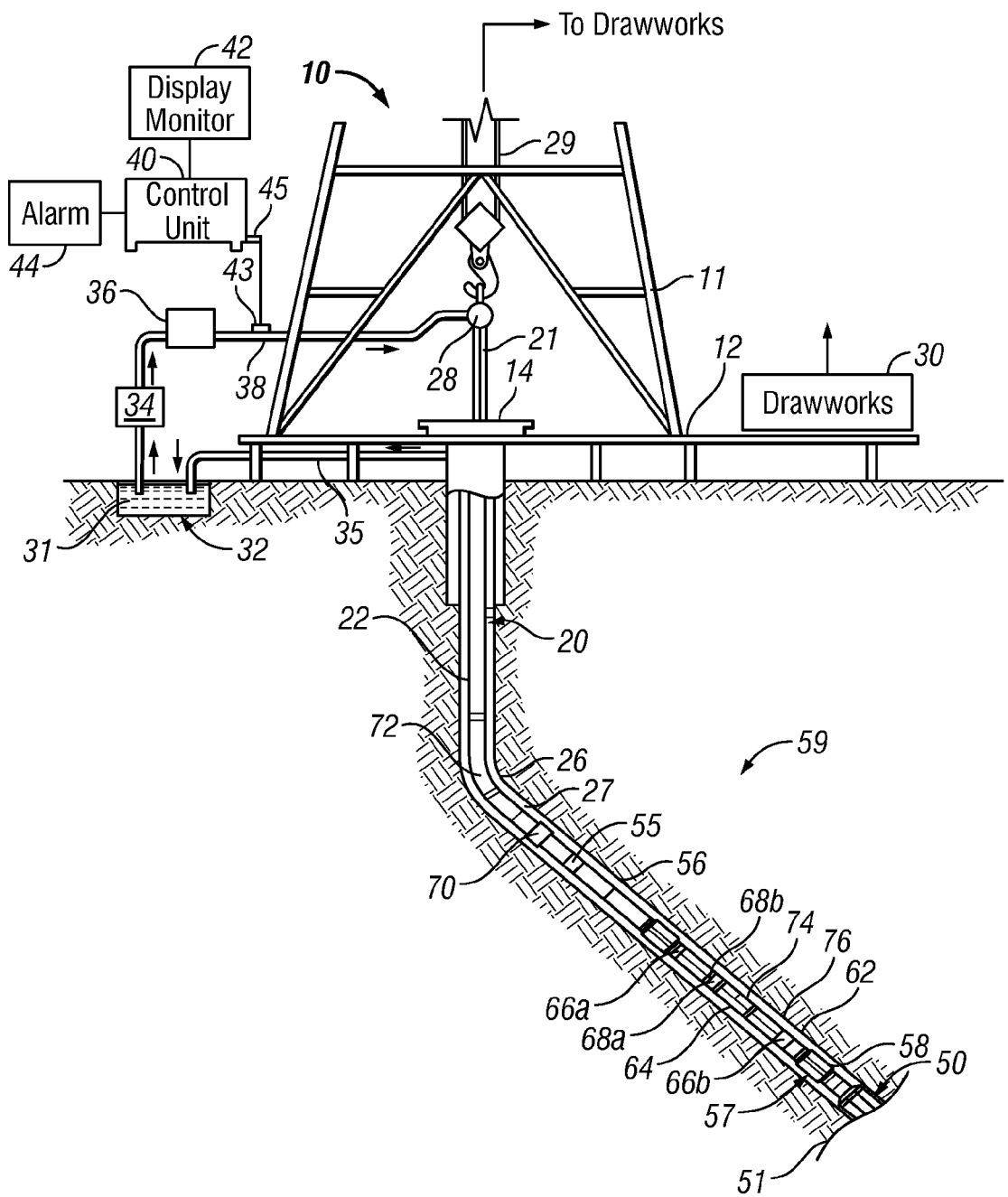
FIG. 1 shows a schematic diagram of a drilling system having a drill string that includes an acoustic sensor system according to the present disclosure.

FIG. 1 shows a schematic diagram of a drilling system 10 having a downhole assembly containing an acoustic sensor system and the surface devices according to one embodiment of present disclosure. As shown, the system 10 includes a conventional derrick 11 erected on a derrick floor 12 which supports a rotary table 14 that is rotated by a prime mover (not shown) at a desired rotational speed. A drill string 20 that includes a drill pipe section 22 extends downward from the rotary table 14 into a borehole 26. A drill bit 50 attached to the drill string downhole end disintegrates the geological formations when it is rotated. The drill string 20 is coupled to a drawworks 30 via a kelly joint 21, swivel 28 and line 29 through a system of pulleys (not shown). During the drilling operations, the drawworks 30 is operated to control the weight on bit and the rate of penetration of the drill string 20 into the borehole 26. The operation of the drawworks is well known in the art and is thus not described in detail herein.

During drilling operations a suitable drilling fluid (commonly referred to in the art as "mud") 31 from a mud pit 32 is circulated under pressure through the drill string 20 by a mud pump 34. The drilling fluid 31 passes from the mud pump 34 into the drill string 20 via a desurger 36, fluid line 38 and the kelly joint 21. The drilling fluid is discharged at the borehole bottom 51 through an opening in the drill bit 50. The drilling fluid circulates uphole through the annular space 27 between the drill string 20 and the borehole 26 and is discharged into the mud pit 32 via a return line 35. A variety of sensors (not shown) may be appropriately deployed on the surface according to known methods in the art to provide information about various drilling-related parameters, such as fluid flow rate, weight on bit, hook load, etc.

A surface control unit 40 receives signals from the downhole sensors and devices via a sensor 43 placed in the fluid line 38 and processes such signals according to programmed instructions provided to the surface control unit. The surface control unit displays desired drilling parameters and other information on a display/monitor 42 which information is utilized by an operator to control the drilling operations. The surface control unit 40 contains a computer, memory for storing data, data recorder and other peripherals. The surface control unit 40 also includes models and processes data according to programmed instructions and responds to user commands entered through a suitable means, such as a keyboard. The control unit 40 may be adapted to activate alarms 44 when certain unsafe or undesirable operating conditions occur.

A drill motor or mud motor 55 coupled to the drill bit 50 via a drive shaft (not shown) disposed in a bearing assembly 57 may be used to rotate the drill bit 50 when the drilling fluid 31 is passed through the mud motor 55 under pressure. It should be noted that acoustic MWD measurements are typically made using a rotary steerable device and without the use of mud motors. The bearing assembly 57 supports the radial and axial forces of the drill bit, the downthrust of the drill motor and the reactive upward loading from the applied weight on bit. A stabilizer 58 coupled to the bearing assembly 57 acts as a centralizer for the lowermost portion of the mud motor assembly.

In a specific embodiment of the system of present disclosure, the downhole subassembly 59 (also referred to as the bottomhole assembly or "BHA") which contains the various sensors and MWD devices to provide information about the formation and downhole drilling parameters, is coupled between the drill bit 50 and the drill pipe 22. The downhole assembly 59 may be modular in construction, in that the various devices are interconnected sections so that the individual sections may be replaced when desired. For the purposes of the present disclosure, the BHA 59 may also be referred to as a "carrier."

Still referring back to FIG. 1, the BHA may also contain sensors and devices in addition to the above-described sensors. Such devices include a device for measuring the formation resistivity near and/or in front of the drill bit, a gamma ray device for measuring the formation gamma ray intensity and devices for determining the inclination and azimuth of the drill string. The formation resistivity measuring device 64 may be coupled above a lower kick-off subassembly or a rotary steerable device 62 that provides signals, from which resistivity of the formation near or in front of the drill bit 50 is determined. One resistivity measuring device is described in U.S. Pat. No. 5,001,675, which is assigned to the assignee hereof and is incorporated herein by reference. This patent describes a dual propagation resistivity device ("DPR") having one or more pairs of transmitting antennae 66a and 66b spaced from one or more pairs of receiving antennae 68a and 68b. Magnetic dipoles are employed which operate in the medium frequency and lower high frequency spectrum. In operation, the transmitted electromagnetic waves are perturbed as they propagate through the formation surrounding the resistivity device 64. The receiving antennae 68a and 68b detect the perturbed waves. Formation resistivity is derived from the phase and amplitude of the detected signals. The detected signals are processed by a downhole circuit that may be placed in a housing 70 above and transmitted to the surface control unit 40 using a suitable telemetry system 72.

The inclinometer 74 and gamma ray device 76 are suitably placed along the resistivity measuring device 64 for respectively determining the inclination of the portion of the drill string near the drill bit 50 and the formation gamma ray intensity. Any suitable inclinometer and gamma ray device, however, may be utilized for the purposes of this disclosure. In addition, an azimuth device (not shown), such as a magnetometer or a gyroscopic device, may be utilized to determine the drill string azimuth. Such devices are known in the art and are, thus, not described in detail herein.

Figure 2:
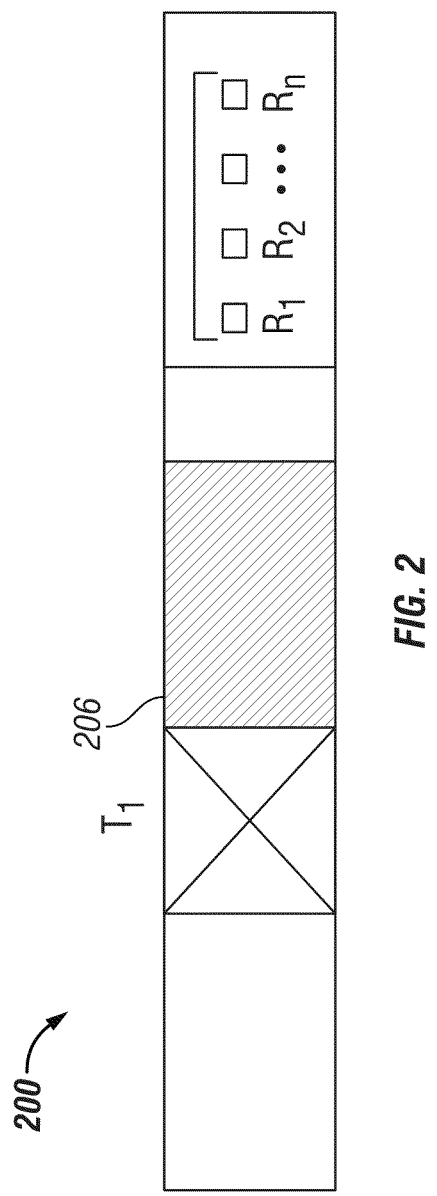
FIG. 2 shows an embodiment of the acoustic sensor system for use in the system of the present disclosure.

FIG. 2 is a schematic diagram of a portion of the downhole subassembly showing an embodiment of the acoustic system of the present disclosure placed in the MWD section 59 shown in FIG. 1. The acoustic subsystem of FIG. 2 may be placed between the mud motor or rotary steerable device 55 and the downhole telemetry section 72. The subsystem 200 contains an acoustic transmitter or a set of transmitters $T_1$ separated by an acoustic isolator section 206 from a plurality of acoustic receivers $R_1$-$R_n$ placed axially spaced from each other and from the transmitter $T_1$.

Figure 3:
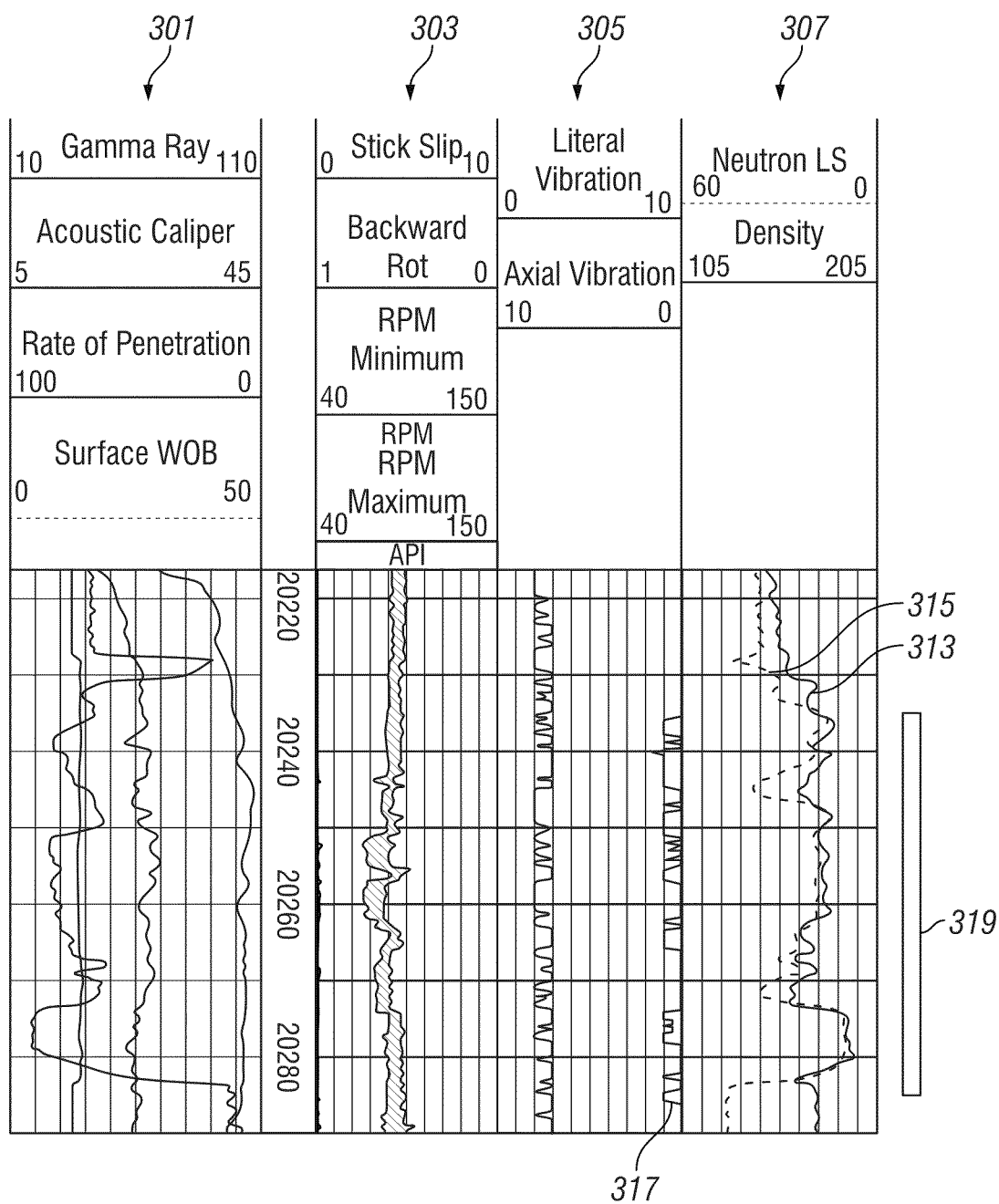
FIG. 3 shows an exemplary logged interval from a synthesized offshore data set having low porosity calcite streaks.

FIG. 3 shows a synthesized offshore data set. Track 301 includes the gamma ray log 311 that is indicative of the shale content of the formation, or other rocks containing minerals emitting gamma rays, hereafter called shale for the purposes of this patent. Tracks 303 and 305 show the drilling dynamics information, while track 307 shows the density 313 and neutron porosity 315. The interval labeled as 319 includes several low porosity calcite beds. The axial vibrations 317 within the calcite beds could be expected to cause problems in sonic measurements.

Figure 4A:
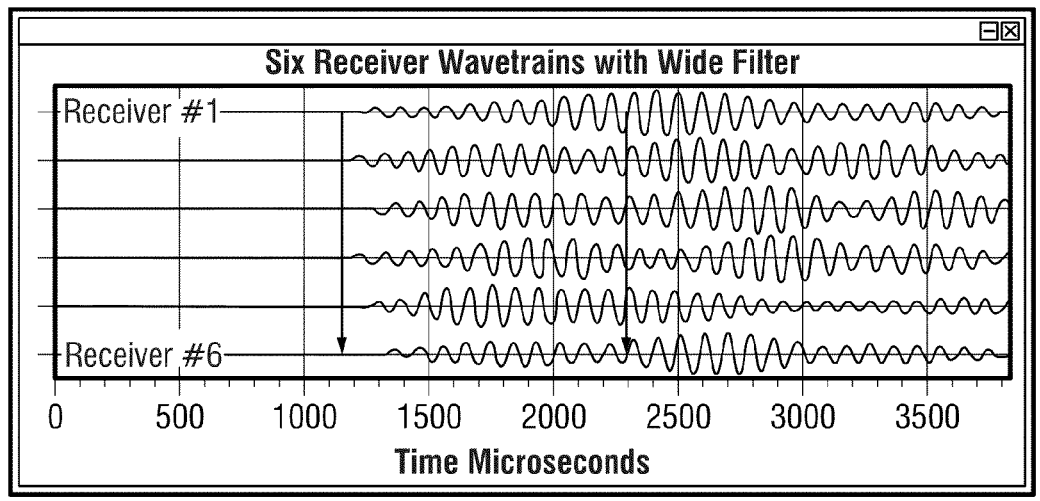
FIGS. 4a and 4b show exemplary signals at two different bandpass filter settings.
Figure 4B:
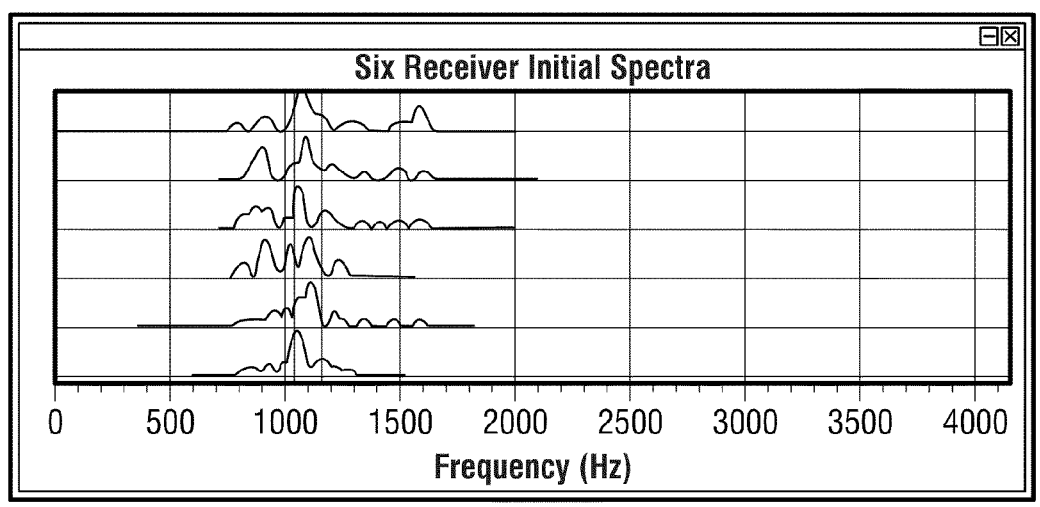

High frequency (HF) and low frequency (LF) monopole modes of the acoustic signals were processed in order to estimate which frequency contains the best signal quality. From this step, the HF monopole mode was selected to process the compressional slowness. The software interface displays the waveforms recorded from the six-receiver array and their corresponding frequency spectra (FIGS. 4a, 4b). The signal is fairly narrow-band, centered around 11 kHz and exhibits a high level of ringing in the time domain.

Figure 5:
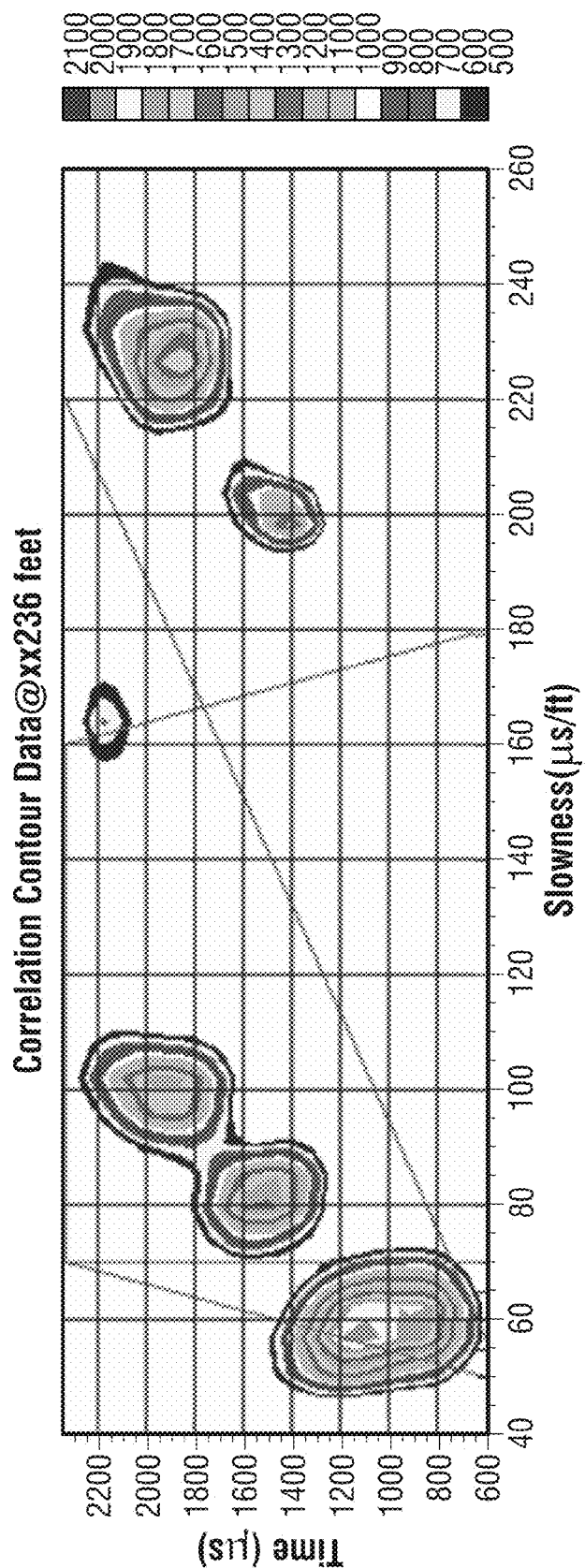

The correlation contour (FIG. 5) generated from the semblance processing over a specific depth interval shows numerous peaks of the semblance, making it difficult to identify the peaks corresponding to the actual formation signal.

As a first pass for the processing, the input parameters were set up as follows for the entire interval:
Nroot Processing
Time window start: 400 µs (microseconds)
Time window end: 2700 µs
DT window start: 40 µs/ft (microseconds per foot)
DT window end: 260 µs/ft
Correlation window length: 400 µs/ft
Correlation window step: 200 µs/ft
FFT filter: low: 7.0 kHz (kilohertz)
  high: 13.0 kHz The Nth-root-stacking technique is very similar to the semblance technique except that the waveform amplitudes are modified in a different way to produce a so-called "pseudo" power spectrum, instead of the true power spectrum. The correlation window step is set to the actual period (T) of the waveforms and the correlation window length is set as two to three times the window step. The Time and DT window start/end values are the normal standards employed for most compressional slowness processing.

Figure 6:
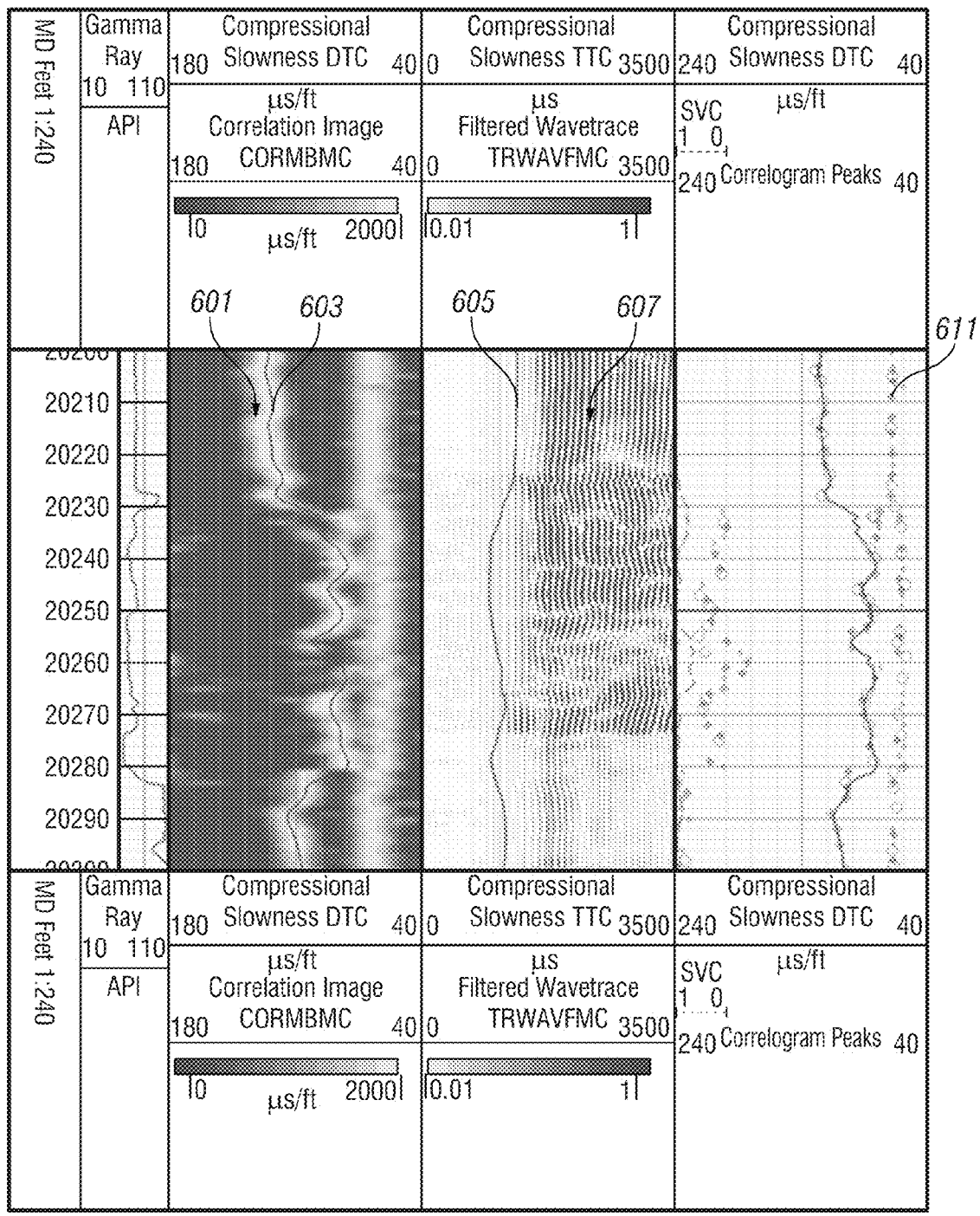
FIG. 6 shows post-processing quality control (QC) of the initial correlogram plot before petrophysically guided processing is applied.

Using the parameters above, processing results yielded a coherent signal over the intervals where shales and sands were encountered; however, some areas show correlograms of low coherence. This is seen in FIG. 6. Shown therein are the correlation image 601, the picked slowness 603, the picked compressional wave transit time 605, and the filtered signal 607. The last track shows the picked compressional slowness along with the three nearest picks of the correlograms 611. The low coherency areas correlate to the inter-bedded calcite streaks, and the low correlogram quality makes it difficult to estimate the true compressional slowness.

Figure 7A:
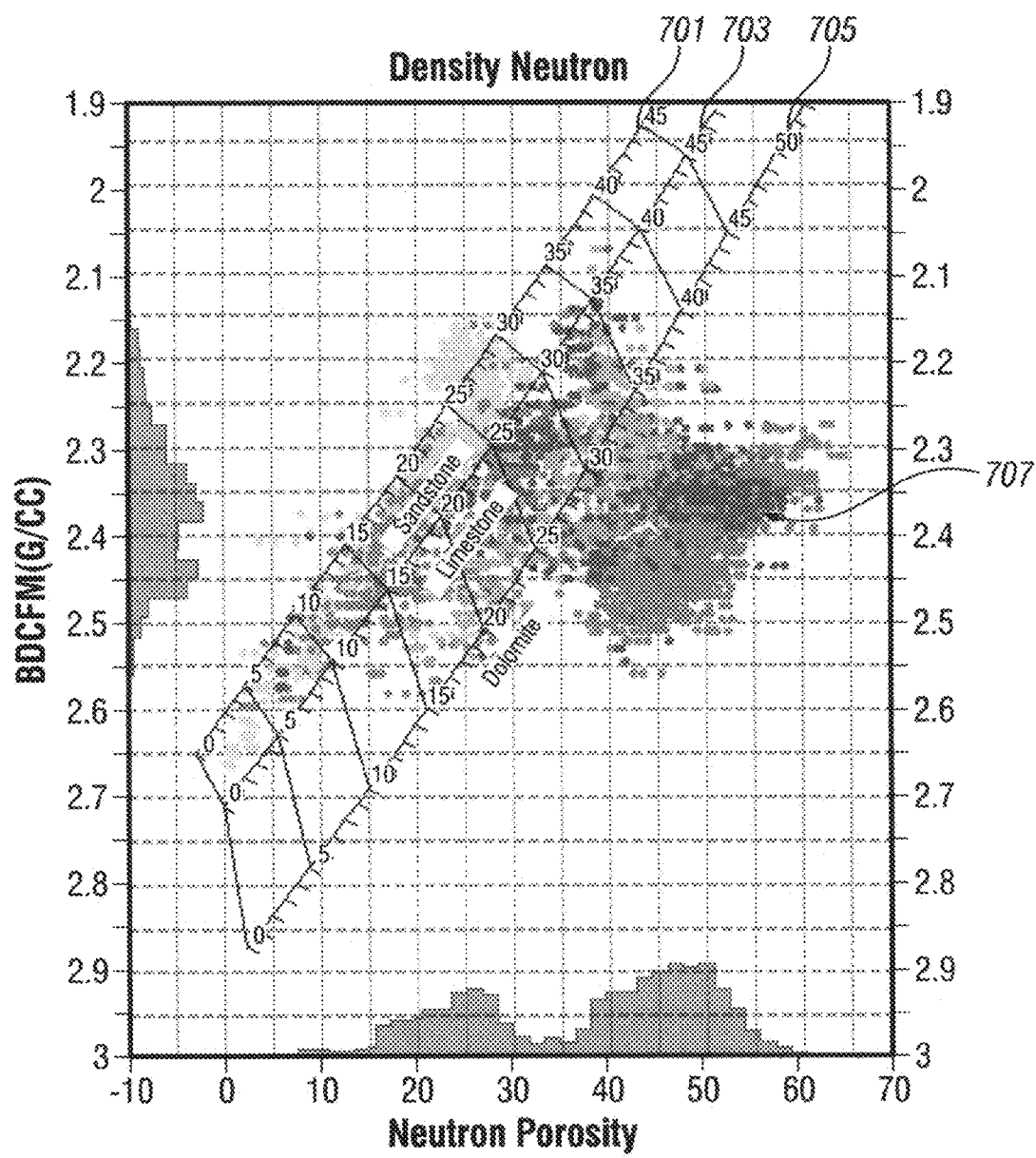
FIGS. 7a and 7b show cross plots of bulk density against neutron porosity for the exemplary depth interval.
Figure 7B:
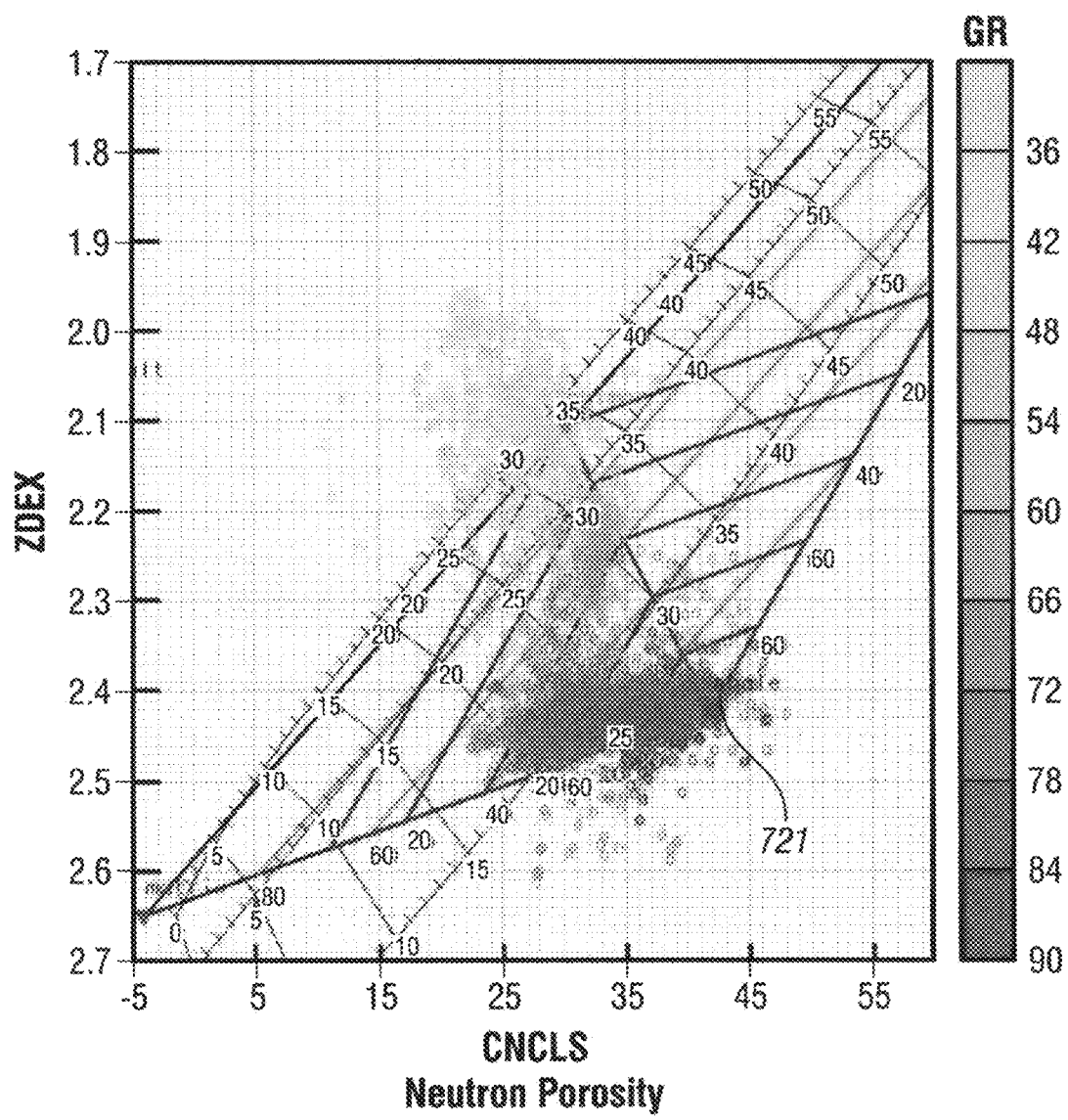

In the present disclosure, neutron, density and gamma ray measurements are used in conjunction with the first processing iteration of the compressional slowness to generate a synthetic theoretical compressional slowness. As applied here, the methodology employs a combined deterministic and probabilistic approach to generate the synthetic response. FIGS. 7a and 7b show cross plots of the density (ordinate) and neutron porosity (abscissa) data with the color coding sourced from the gamma ray for the interval of interest. The lines for sandstone 701, limestone 703 and dolomite 705 are indicated in the figures. The shales are generally indicated by the areas highlighted by 707 in FIG. 7a and by 721 in FIG. 7b. Selection of the bulk shale response for each measurement is made using the log plots and the cross plots.

Figure 8:
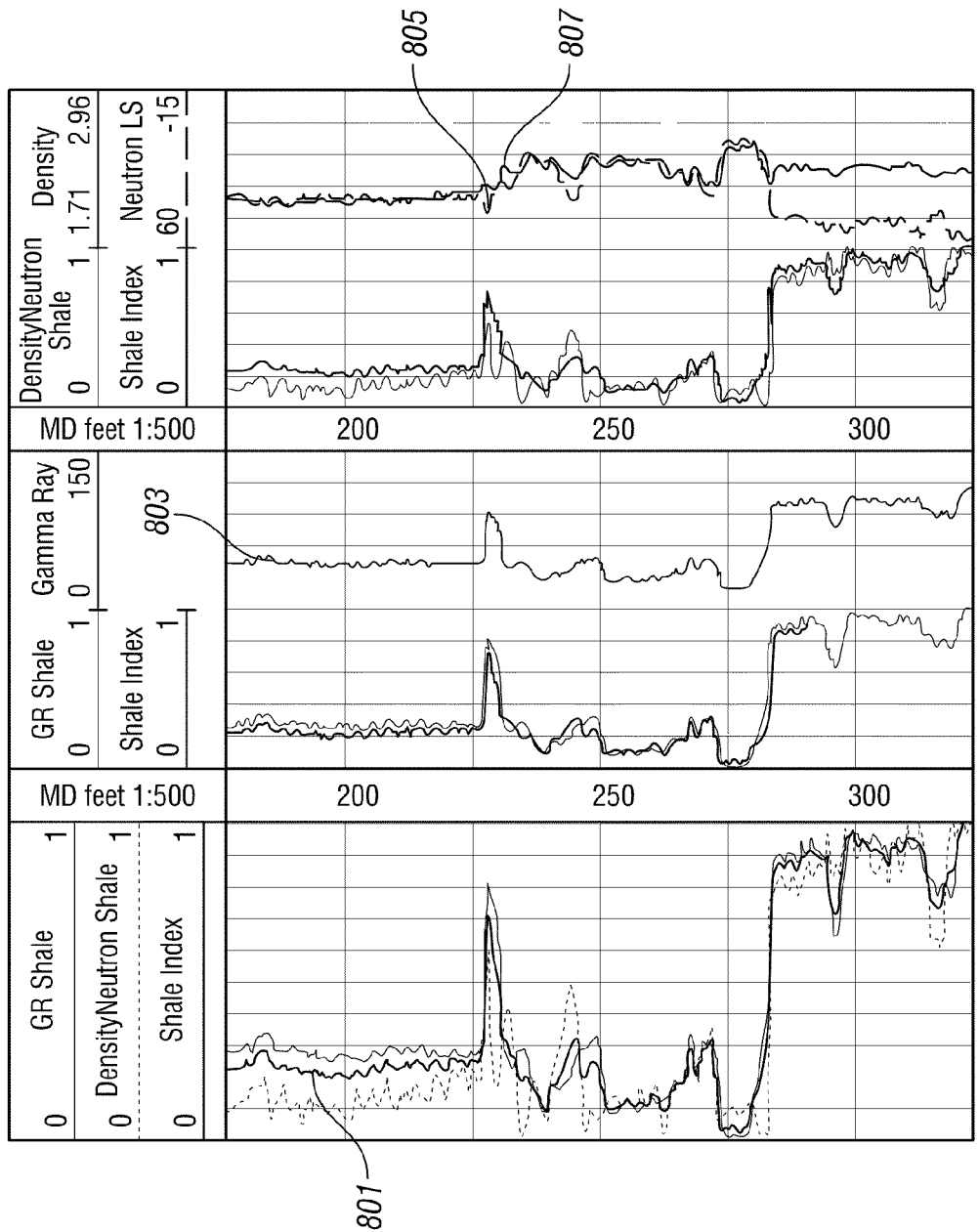
FIG. 8 shows plots of the shale index, gamma ray, density and neutron logs.

Given the bulk shale response and the data available, a deterministic approach can be employed to get to a first estimate of the bulk volume of shale in the formation. In this case estimates were made from the gamma ray, and density-neutron, which were then combined in a user weighted process with more importance being placed on the Gamma Ray for the resulting bulk shale estimate (FIG. 8). Shown therein are the gamma ray 803, the neutron porosity 805, the bulk density 807 and the shale index 801.

Once the initial estimate of the bulk shale volume (Shale Index) is obtained, it is used along with the first estimate of compressional slowness to estimate the acoustic shale parameters along the wellbore. Acoustic shale properties are often affected by the degree of compaction (the slowness value normally decreases as depth increases under normal compaction trends). In order to provide a reasonable estimate of the changing shale properties, the initial acoustic results are statistically sampled using the initial shale index estimate as a discriminator and the resulting data is then extrapolated over the interval to provide a continuous changing value for the acoustic shale response which accounts for the compaction effects in the formation.

Figure 9:
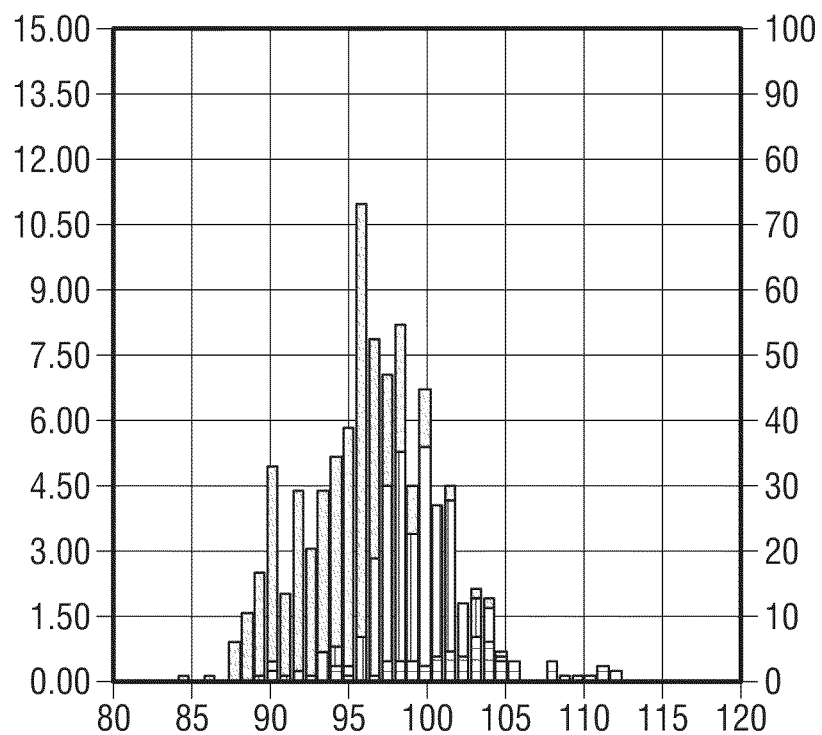
FIG. 9 shows a histogram of compressional slowness from the initial estimate over three depth intervals with a cutoff of 70% bulk shale.

Clearly, if the interval is short or if compaction is not an issue, this continuous estimate can be replaced with a single parameter representative of the shale response. FIG. 9 shows the more normal situation wherein the shale slowness is decreasing with increasing depth (~600 meter interval). Slowness in the shales varies from ~108-112 µs/ft (blue) in the upper part to ~102-105 µs/ft (red) in the middle of the interval and down to ~100 µs/ft (green) in the lower part of the interval.

Figure 10:
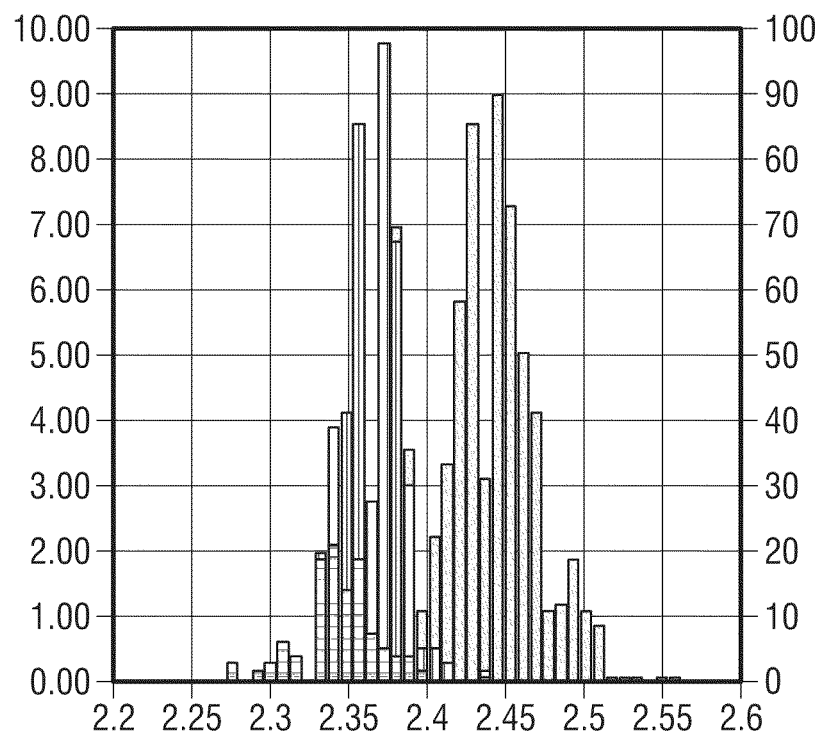
FIG. 10 shows a histogram of bulk density from the initial estimate over three depth intervals with a cutoff of 70% bulk shale.

For the same intervals and color code, the density response is also shown in FIG. 10. In this case we see increasing shale density with depth. The lower shale (green) shows a wide spread of data trending to higher densities indicating that the composition of this bulk shale is a little variable and there may be more heavy constituents in the deposition. In this example, values above 2.47 g/cc are indicative of increasing limestone/calcite content.

The histograms shown in FIGS. 9 and 10 are indicative of the three main shale packages as seen over a long interval of data.

Figure 11:
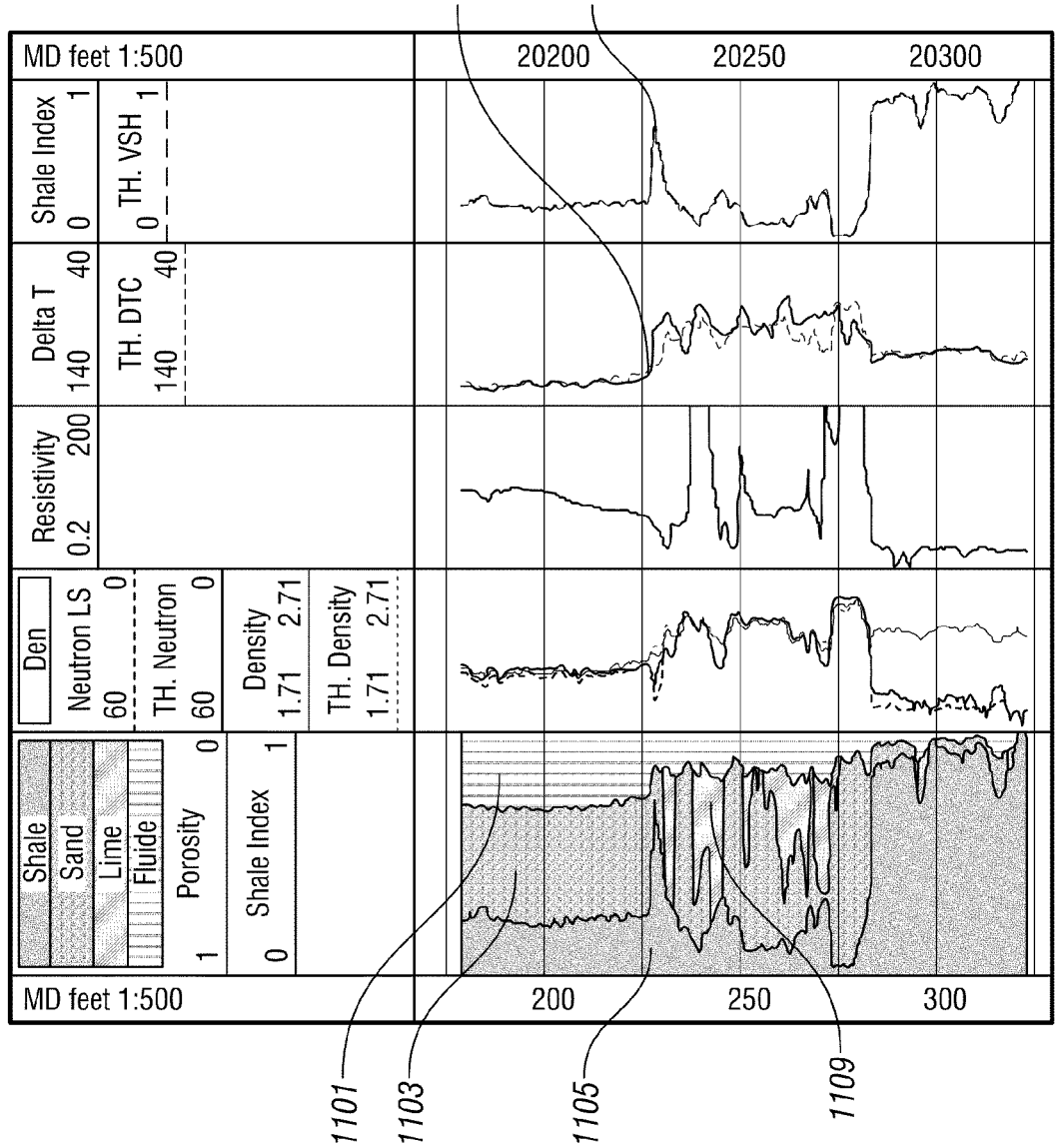
FIG. 11 shows the volumetrics based on neutron, density and shale index, and the theoretical compressional slowness derived from this volumetric model.

Next, lithology and porosity are calculated (FIG. 11), using a locally linear probabilistic approach. A model is constructed for the lithology to be solved and the appropriate parameters for the available devices are input. The input acoustic response is set to a fixed value. By setting the uncertainty of the input acoustic response to an extremely high number, inputting the proper acoustic parameters for the lithology model, and using the estimated acoustic bulk shale response (variable or fixed), the system will solve for the formation lithology and at the same time generate a theoretical compressional slowness along with the other theoretical logs which are used for determination of the soundness of the model solution. Since the uncertainty in the acoustic measurement was set high, it has no influence on the resulting solution other than to use the final solution for the theoretical log calculation. The lithologies indicated are fluid 1101, sandstone 1103, shale 1105 and limestone 1109. The petrophysics-derived theoretical acoustic slowness is calculated via a simple extension of the Wylie time average equation of the form:

$$\Delta T_{pth} = \phi \Delta T_{fluid} + \Delta T_{sand} V_{sand} + \Delta T_{lime} V_{lime} + \Delta T_{shale} V_{shale}, \quad (1)$$

where $\Delta T_{pth}$ is the theoretical compressional slowness, $\phi$ is the volume fraction of fluid, and $V_x$ are the respective volume fractions of sand, limestone, and bulk shale with respective matrix slowness values. The curves 1113 show the variance of the initial compressional wave slowness versus the petrophysically-derived theoretical result, while 1111 is the shale index. Also shown are the one-standard deviation bounds on the curve.

As an alternative to the time average relation given by eqn. (1), other relations between the formation porosity, formation shear slowness and matrix shear slowness may be used. One such relation is that given by Castagna:

$$\phi = \frac{\Delta T_s - \Delta T_s^{matrix}}{\alpha - \Delta T_s^{matrix}},$$

Where $\Delta T_s$ is shear slowness, $\Delta T_s^{matrix}$ is the rock matrix shear slowness, and $\alpha$ is a pseudo-fluid shear slowness between 330 to 450 μs/ft.

Where compressional velocity and lithology are known, it is also possible to make an initial estimate of shear velocity via an estimated ratio of compressional velocity to shear velocity. Additionally, it is possible to use several possible elasto-acoustic constitutive relations that relate acoustic compressional or shear slownesses or velocities to the volume fractions of porosity and lithology components along with the elastic moduli of the constituents. Collectively, the methods described above with respect to FIG. 11 are referred to as elasto-acoustic constitutive relations.

Figure 12:
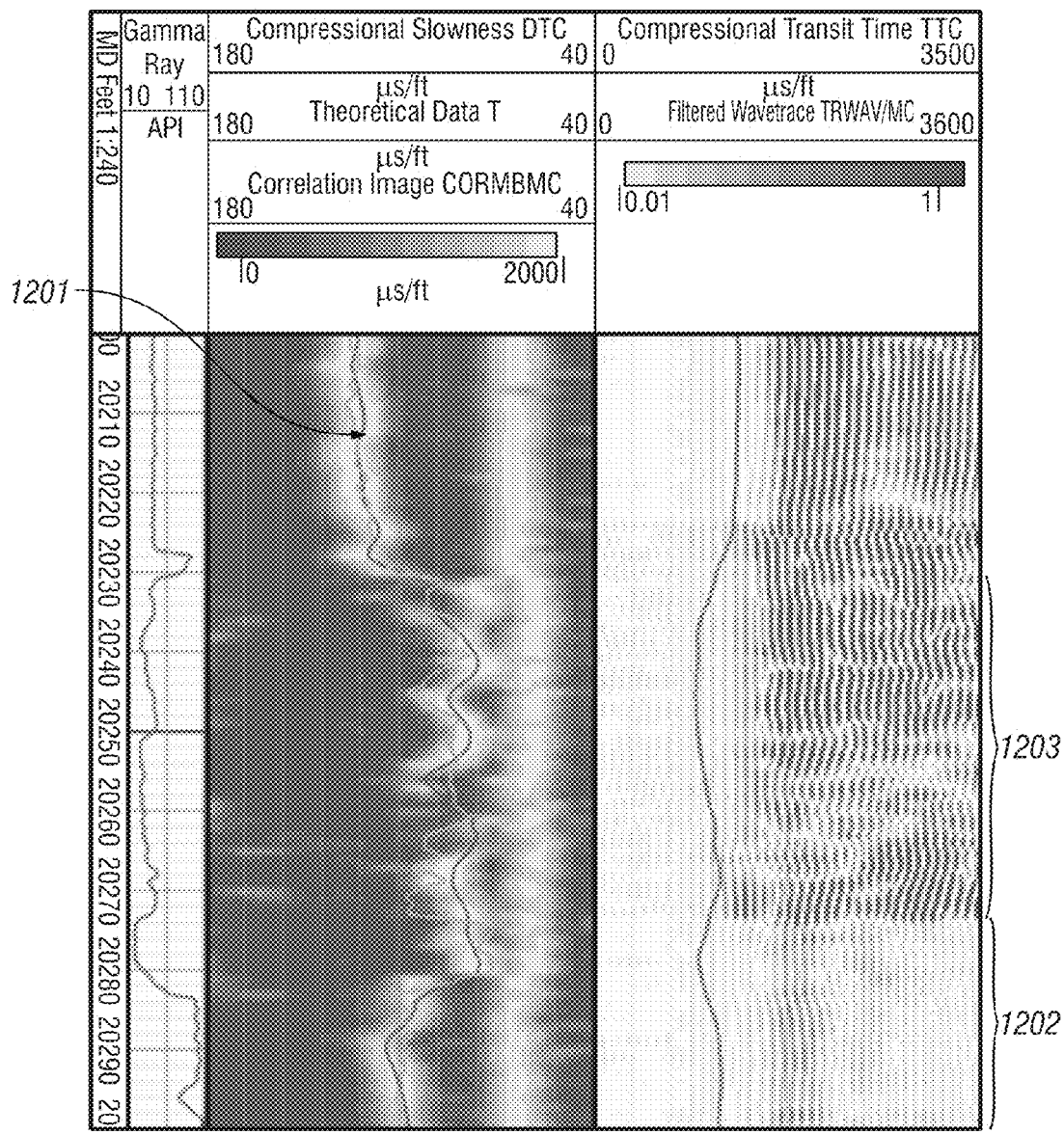
FIG. 12 shows a comparison of the theoretical compressional slowness with the quality control data over two different intervals.

After the theoretical compressional slowness is obtained, the theoretical curve for compressional slowness 1201 is overlapped into the previous acoustic quality control correlogram plot (FIG. 12). Over the shale zones 1202 both curves (post-processed and theoretical compressional slowness) agree well. Differences are noticeable between the post-processed acoustic slowness and the theoretical compressional slowness in the areas where the calcite streaks are present 1203.

Figure 13:
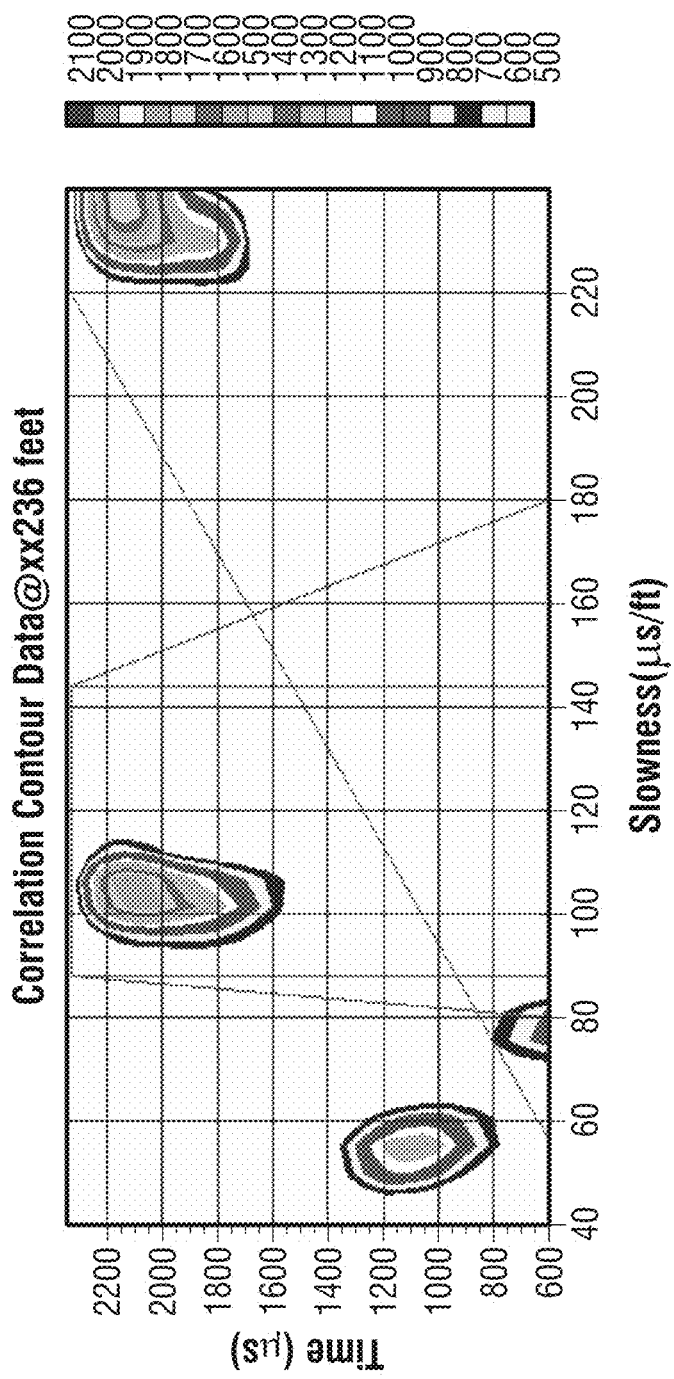
FIG. 13 shows a processed correlogram obtained using processing parameters based on the theoretical compressional slowness.

With the theoretical value of acoustic compressional slowness now available a second acoustic processing is made. Over the intervals where the correlogram is not clear, the value from the theoretical curve is used as a guide in order to extract the slowness that represents this value on the acoustic data. With the petrophysics-derived ΔT curve as a guide, we reduced in frequency both the low and high settings for the Fast Fourier Transform filter, enhancing what we now can recognize as the correct correlogram contour and removing most of the inappropriate correlations. We also narrowed the "DT window end" to chop out some remaining vestiges of noise or possible slow mode arrivals. The new parameters are:

Time window start: 400 μs
Time window end: 2700 μs
DT window start: 45 μs/ft
DT window end: 180 μs/ft
Correlation window length: 300 μs/ft
Correlation window step: 100 μs/ft
FFT filter: low: 10.46 kHz
  High: 10.96 kHz The results of the new processing can be observed from the correlation contour window at the same depth of the previous processing (FIG. 13). Now, instead of a series of correlogram contours (see FIG. 5), a sharper, well-defined correlogram is present close to the theoretical acoustic slowness value.

Figure 14:
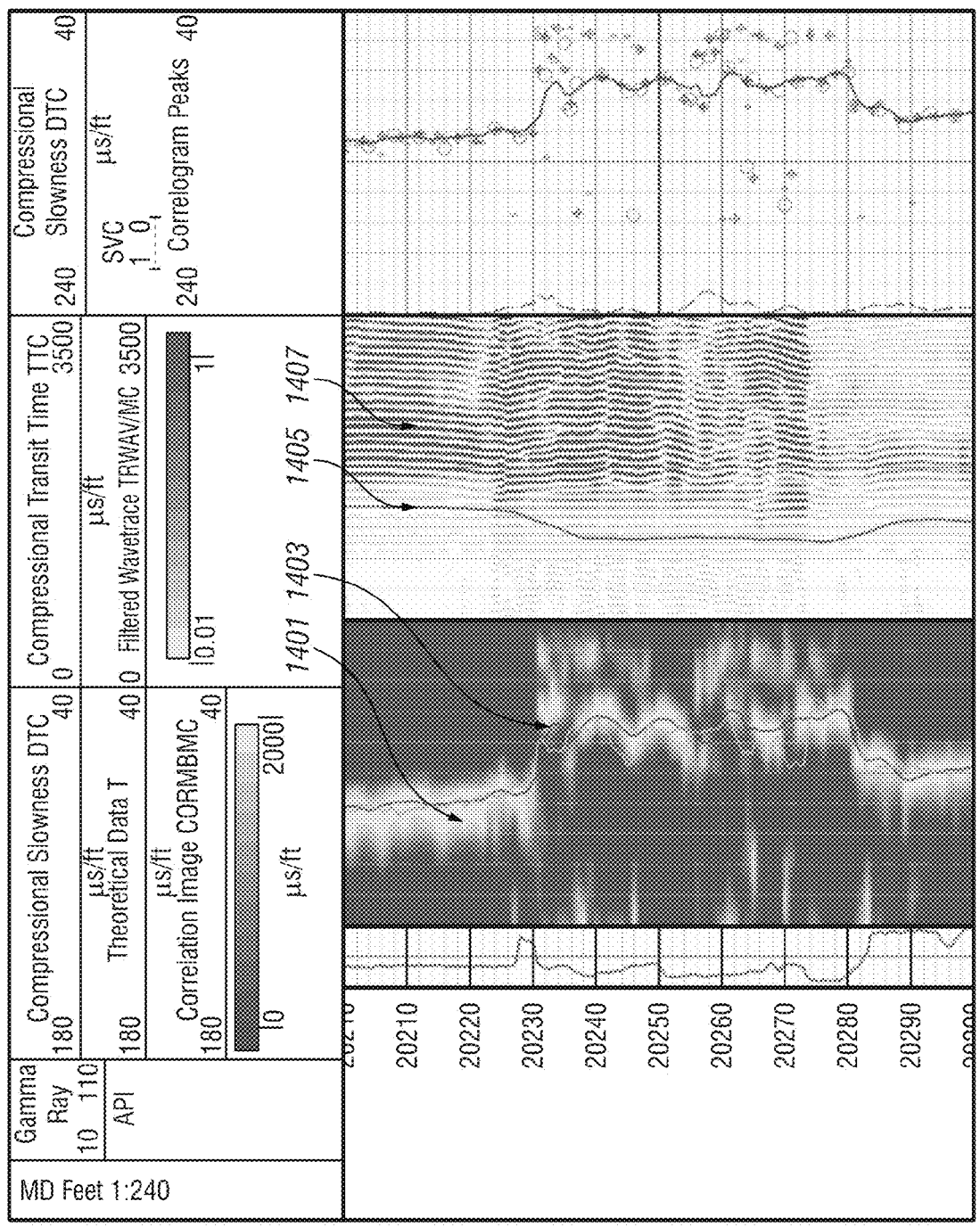
FIG. 14 shows a comparison between the petrophysics-guided semblance processing and the predicted theoretical compressional slowness.

The new compressional slowness curve obtained from this second processing is presented on a QC correlogram plot over the interval where the interbedded calcite streaks are seen (FIG. 14). Now a sharper—higher coherence correlogram is observed; the difference between the theoretical and the post-processing compressional slowness has been reduced. Shown in FIG. 14 are the correlation image 1401, the picked slowness 1403, the picked compressional wave transit time 1405, and the filtered signal 1407. The last track shows the picked compressional slowness along with the three nearest picks of the correlograms. The scatter of the correlogram peaks in the right panel of FIG. 14 is reduced from that in the right panel of FIG. 6.

The method described above can also be used for analysis of shear wave acoustic data. U.S. Pat. No. 6,850,168 to Tang et al., having the same assignee as the present disclosure and the contents of which are incorporated herein by reference, discloses an apparatus and method of acquiring MWD shear wave data. The logging tool of Tang includes a transmitter configured to be conveyed on a drilling collar and excite a quadrupole signal in a borehole being drilled by a drill bit and a receiver configured to receive the signal. The transmitter is configured to be operated at a frequency below the cut-off frequency of the quadrupole collar mode. The received signal consists primarily of the formation quadrupole mode which, at low frequencies, has a velocity that approaches the formation shear velocity.

From the perspective of petrophysicists comfortable in the language of lithology, porosity, and saturation, we used several methods from prior art that seek to transform shear slowness into practically useful petrophysical relationships. This method assumes shear slowness depends on shale content, matrix slowness, and porosity/fluid slowness in a pseudo-Wyllie time average equation:

$$\phi = \frac{\Delta T_s - \Delta T_s^{matrix}}{\alpha - \Delta T_s^{matrix}}, \quad (2)$$

where $\phi$ is porosity, $\Delta T_s$ is shear slowness, $\Delta T_s^{matrix}$ is the rock matrix shear slowness, and is a pseudo fluid shear slowness that is nominally fitted to about 340 μs/ft. We add a bulk shale term as per Equation #1 and find α to be 450 μs/ft in our Gulf of Mexico data set and also in a carbonate data set.

In time average equations, for our data sets, the following parameters were used:
Dolomite
$\Delta T_p$=44 μs/ft
$\Delta T_s$=72 μs/ft
ρ=2.87 g/cm³

α=450 μs/ft
Calcite
$\Delta T_p$=47 μs/ft
$\Delta T$=89 μs/ft
ρ=2.71 g/cm³
α=450 μs/ft
Anhydrite
$\Delta T_p$=54 μs/ft
$\Delta T_s$=98 μs/ft
ρ=2.97 g/cm³
α=450 μs/ft
Sandstone
$\Delta T_p$=55 μs/ft
$\Delta T_s$=88 μs/ft
ρ=2.65 g/cm³
α=450 μs/ft
Shale well #1
$\Delta T_p$=102 μs/ft
$\Delta T_s$=not defined
ρ=2.40 g/cm³
Shale well #2
$\Delta T_p$=100 μs/ft
$\Delta T_s$=225 μs/ft
ρ=2.40 g/cm³
α=450 μs/ft
Shale well #3
$\Delta T_p$=100 μs/ft
$\Delta T_s$=238 μs/ft
ρ=2.45 g/cm³
α=450 μs/ft For our limited purposes, it was found that other prior art methods expressed in terms of the squares of compressional and shear slowness were less stable and less satisfactory for our purpose. Squared acoustic slowness values relate to the elastic moduli of the rock via the compressional wave modulus:

$$M = \frac{\rho}{(\Delta T_p)^2} \text{(dynes/cm}^2\text{)}, \quad (3)$$

and shear wave modulus:

$$M = \frac{\rho}{(\Delta T_s)^2} \text{(dynes/cm}^2\text{)}, \quad (4)$$

where ρ equals bulk density in grams/cc, $$\frac{1}{(\Delta T_p)^2}$$

is compressional velocity squared, $$\frac{1}{(\Delta T_s)^2}$$

is shear velocity squared, each in feet squared per seconds squared.

Figure 15:
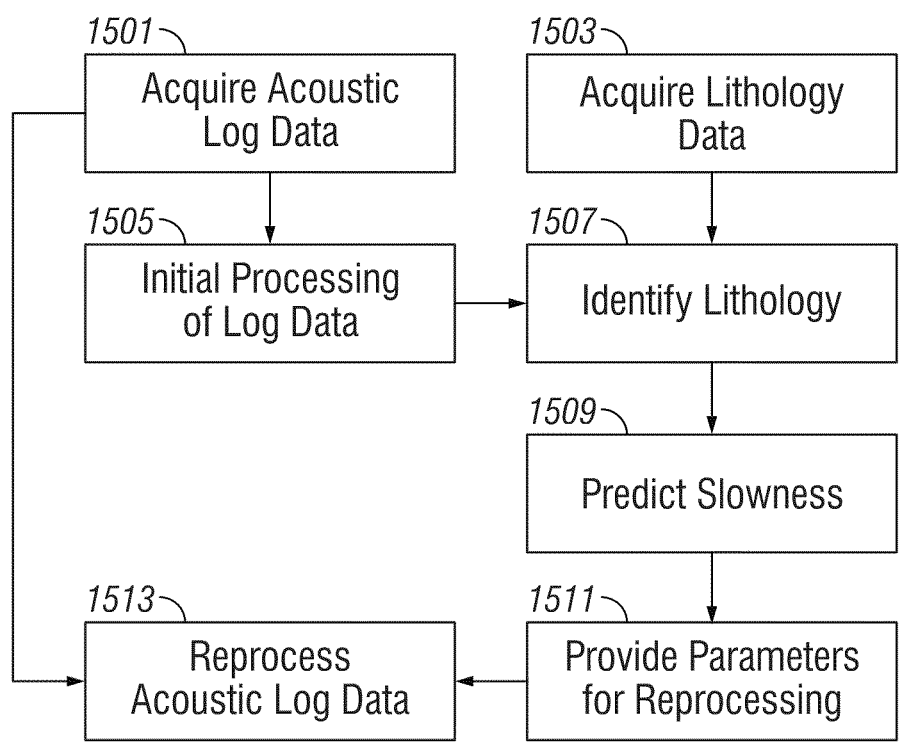
FIG. 15 is a flow chart illustrating some of the steps of the present disclosure.

Turning now to FIG. 15, a flow chart of some of the steps of the present method is shown. The method is directed to evaluation of an earth formation. Acoustic data are acquired 1501. This is done by using the acoustic subsystem 200 on the carrier 59. As noted above, signals indicative of compressional wave velocities are typically obtained using a monopole acoustic source. Signals indicative of shear wave velocities may be obtained using a quadrupole source. It is also possible to process data acquired with a monopole source to estimate shear velocities in so-called "fast formations" where the formation shear velocity is greater than the compressional velocity of the borehole fluid. Other formation evaluation data, such as gamma ray data, bulk density data and/or neutron porosity data may also be obtained 1503. These may be collectively referred to as lithologic data.

The acoustic data are processed with an initial set of processing parameters 1505 (as shown above) and an initial estimate of the formation slowness and the lithologic data is used to identify the formation lithology 1507. Using the formation lithology, a prediction is made of what the acoustic slowness should be 1509. The predicted acoustic slowness is used to provide an updated set of processing parameters 1511 that are used to reprocess the acoustic data. The end result is an improved estimate of compressional and/or shear slowness that, together with the lithlogic data, can be used for formation evaluation and reservoir development.

Those versed in the art and having benefit of the present disclosure would recognize that the present disclosure has the ability to perform the processing of data substantially in real-time. The term "real time" in the context of the present disclosure means "in a matter of seconds" and thus precludes the use of measurements made by logging instruments on an additional logging run.

The data acquisition may be controlled at least in part by the downhole electronics. Implicit in the control and processing of the data is the use of a computer program on a suitable machine readable medium that enables the processors to perform the control and processing. The machine readable medium may include ROMs, EPROMs, EEPROMs, Flash Memories and Optical disks. The term processor is intended to include devices such as a field programmable gate array (FPGA).

While the foregoing disclosure is directed to specific embodiments of the disclosure, various modifications will be apparent to those skilled in the art. It is intended that all variations within the scope of the appended claims be embraced by the foregoing disclosure.

What is claimed is:

1. A method of evaluating an earth formation, the method comprising:
    conveying a carrier into a borehole;
    acquiring acoustic data indicative of a property of the earth formation using an acoustic device on the carrier; and
    using a processor to pick an acoustic data set from the acquired acoustic data, wherein the processor picks the acoustic data set, at least in part, based on processing parameters derived from a petrophysical analysis of lithologic data.

2. The method of claim 1 wherein the lithologic data further comprises at least one of: (i) a gamma ray measurement, (ii) a density measurement, and (iii) a porosity measurement.

3. The method of claim 1 wherein picking the acoustic data set further comprises:
    processing the acquired acoustic data with an initial set of processing parameters;
    identifying a formation lithology;
    using the identified formation lithology for providing an updated set of processing parameters.

4. The method of claim 1 further comprising developing a reservoir using the picked acoustic data set.

5. The method of claim 1 wherein the acquired acoustic data comprise at least one of: (i) compressional wave data, and (ii) shear wave data.

6. The method of claim 3 wherein providing the updated set of processing parameters further comprises predicting a formation velocity using the identified formation lithology.

7. The method of claim 3 wherein providing the updated set of processing parameters further comprises estimating a bulk shale volume of the earth formation.

8. The method of claim 3 wherein providing the updated set of processing parameters further comprises using a relation between a matrix shear velocity, a formation shear velocity and a formation porosity.

9. An apparatus configured to evaluate an earth formation, the apparatus comprising:
   a carrier configured to be conveyed into a borehole;
   an acoustic device on the carrier configured to acquire acoustic data indicative of a property of the earth formation; and
   a processor configured to pick an acoustic data set from the acquired acoustic data using processing parameters, wherein the processing parameters are, at least in part, derived from petrophysical analysis of lithologic data.

10. The apparatus of claim 9 further comprising a formation evaluation sensor configured to acquire the lithologic data, the formation evaluation sensor being selected from: (i) a gamma ray sensor, (ii) a density sensor, and (iii) a porosity sensor.

11. The apparatus of claim 9 wherein the processor is further configured to pick the acoustic data set by further:
   processing the acquired acoustic data with an initial set of processing parameters;
   identifying a formation lithology;
   using the identified formation lithology for providing an updated set of processing parameters.

12. The apparatus of claim 9 wherein the processor is further configured to develop a reservoir using the picked acoustic data set.

13. The apparatus of claim 9 wherein the acoustic data acquired by the acoustic device further comprises at least one of: (i) compressional wave data, and (ii) shear wave data.

14. The apparatus of claim 11 wherein the processor is further configured to provide the updated set of processing parameters by predicting a formation velocity using the identified formation lithology.

15. The apparatus of claim 11 wherein the processor is further configured to provide the updated set of processing parameters by further estimating a bulk shale volume of the earth formation.

16. The apparatus of claim 11 wherein the processor is further configured to provide the updated set of processing parameters by using an elasto-acoustic constitutive relation.

17. A non-transitory computer-readable medium product having stored thereon instructions that when read by a processor cause the processor to execute a method, the method comprising:
   picking an acoustic data set from acoustic data acquired by an acoustic device on a carrier in a borehole, wherein the processor picks the acoustic data set, at least in part, based on processing parameters derived from petrophysical analysis of lithologic data.

18. The non-transitory computer-readable medium product of claim 17 further comprising at least one of:
   (i) a ROM, (ii) an EPROM, (iii) an EEPROM, (iv) a flash memory, and (v) an optical disk.

19. The method of claim 1, wherein the acquired acoustic data picked for the acoustic data set is not altered by the picking.

20. The apparatus of claim 9, wherein the acquired acoustic data picked for the acoustic data set is not altered by the picking.

* * * * *